United States Patent
Gorman (12)

(10) Patent No.: US 6,372,122 B1
(45) Date of Patent: Apr. 16, 2002

(54) METHOD OF REMOVING CONTAMINANTS FROM PETROLEUM DISTILLATES

(75) Inventor: William A. Gorman, Corpus Christi, TX (US)

(73) Assignee: Avista Resources, Inc., Houston, TX (US)

( * ) Notice: Subject to any disclaimer, the term of this patent is extended or adjusted under 35 U.S.C. 154(b) by 0 days.

(21) Appl. No.: 09/630,040

(22) Filed: Aug. 1, 2000

Related U.S. Application Data

(63) Continuation of application No. 09/465,637, filed on Dec. 17, 1999, which is a continuation-in-part of application No. 09/250,741, filed on Feb. 18, 1999, now Pat. No. 6,007,701, which is a continuation of application No. 09/265,903, filed on Mar. 10, 1999.

(51) Int. Cl.[7] ............................................. C10M 175/00

(52) U.S. Cl. ....................... 208/181; 208/179; 208/182; 208/183

(58) Field of Search ................................ 208/184, 179, 208/181

(56) References Cited

U.S. PATENT DOCUMENTS 5,814,207 A  *  9/1998 Kenton ........................ 208/184

* cited by examiner

Primary Examiner—Herlane E. Myers
(74) Attorney, Agent, or Firm—N. Alexander Nolte; Moser, Patterson & Sheridan, L.L.P.

(57) ABSTRACT

In a method of removing acidic compounds, color, and polynuclear aromatic hydrocarbons, and for removing or converting hydrocarbons containing heteroatoms from petroleum distillates, phase transfer catalyst is employed to facilitate the transfer of inorganic or organic bases to the substrate of the distillate. An inorganic or organic base, a phase transfer catalyst selected from the group including quaternary ammonium salts, polyol ethers and crown ethers, and used oil distillate are mixed and heated. Thereafter, contaminants are removed from the used oil distillate through distillation. A solvent is then mixed with the resulting distillate to extract contaminants therefrom. The solvent is recovered and distilled to separate the contaminants therefrom, and is then reused. The petroleum distillate having the contaminants separated therefrom is coalesced to remove any remaining solvent therefrom, with the recovered solvent being reused.

4 Claims, 18 Drawing Sheets

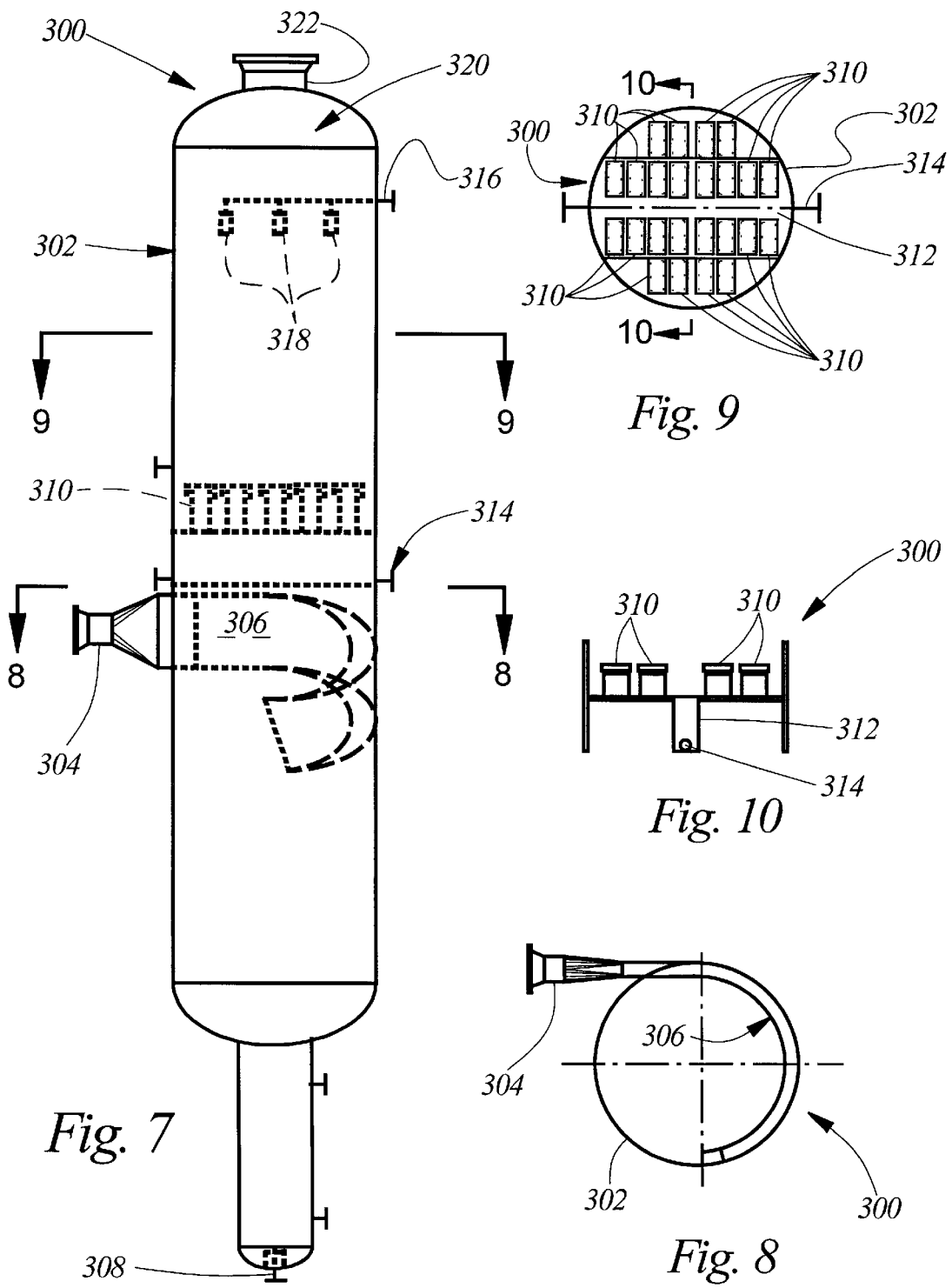

METHOD OF REMOVING CONTAMINANTS FROM PETROLEUM DISTILLATES

This is a continuation of Ser. No. 09/465,637, Dec. 17, 1999 and a CIP of Ser. No. 09/250,741 Feb. 18, 1999 now U.S. Pat. No. 6,007,701 which is a continuation of Ser. No. 09/265,903 pending.

BACKGROUND AND SUMMARY OF THE INVENTION

It has long been recognized that used motor oils can be recycled by removing the contaminants which accumulate therein during operation of the motor vehicles in which the motor oils are utilized. Recently, the American Society for Testing and Materials (ASTM) has promulgated its Designation: D 6074-99 wherein the ASTM Committee D-2 on Petroleum Products and Lubricants has promulgated standards for re-refined base oils. Included in Designation: D 6074-99 are numerous attributes of base oils, including attributes relating to physical properties, compositional properties, chemical properties, and toxicological properties.

Prior to World War II used motor oil was re-refined using a process involving the addition of sulphuric acid in order to separate the contaminants from the useful hydrocarbon components of used motor oil. Re-refining processes of the type involving the addition of sulphuric acid to used motor oil are no longer used because they result in the generation of large amounts of highly toxic acidic sludge which cannot be disposed of economically.

Additionally, such re-refining techniques do not fulfill the requirements of ASTM Designation: D 6074-99.

More recently, used motor oils have been re-refined utilizing a process known as hydrotreating. In accordance with the hydrotreating process, used motor oils are treated with hydrogen at high temperature and pressure. Hydrotreating is successful in saturating olefins and aromatics in used motor oils and can also be used in removing heteroatoms therefrom. However, the hydrotreating process is expensive to the point that it cannot be operated profitably.

U.S. Pat. No. 5,814,207 discloses a used motor oil re-refining method and apparatus wherein up to four evaporators are connected one to another in a series. It will therefore be understood that the apparatus of the '207 patent is expensive to install and use. More importantly, the used motor oil re-refining method of the '207 patent cannot meet the requirements of ASTM Designation: D 6074-99 because it cannot remove heteroatoms and because it cannot meet the toxicological requirements of the designation.

Co-pending U.S. application Ser. No. 09/250,741 filed Feb. 16, 1999, and assigned to the assignee hereof discloses a re-refining process wherein used motor oil is treated with an organic or inorganic base in the presence of a phase transfer catalyst. The process is successful in removing acidic compounds and color and in removing or substituting heteroatoms from used motor oil distillates. Co-pending application Ser. No. 09/265,903 filed Mar. 24, 1999, and also assigned to the assignee hereof discloses a re-refining process wherein used motor oil is contacted with a highly polar organic solvent, such as N,N-dimethylformamide. The process is successful in removing polynuclear aromatic hydrocarbons, sulphur-containing substances, nitrogen-containing substances, and other contaminants from used motor oil and distillates.

Co-pending application Ser. No. 09/465,637 filed Dec. 17, 1999 discloses a process for re-refining used motor oils wherein the process of application Ser. No. 09/250,741 and the process of application Ser. No. 09/265,903 are operated in series. The process of the invention is unique in that it is the only known process which safely and economically fulfills all of the requirements of ASTM Designation: D 6074-99.

The present invention comprises further improvements in the process disclosed in application Ser. No. 09/465,637. Included are improvements in the design and operation of the liquid/vapor separators which are used in the process. Also included are improvements in heat transfer and heat recovery which made the process more efficient.

BRIEF DESCRIPTION OF THE DRAWINGS

A more complete understanding of the invention may be had by reference to the following Detailed Description when taken in conjunction with the accompanying Drawings wherein:

FIG. 7 is a diagrammatic illustration of a liquid/vapor separator utilized in the practice of the present invention;

FIG. 8 is a sectional view taken along the line 8—8 in FIG. 7 in the direction of the arrows;

FIG. 9 is a sectional view taken along the line 9—9 in FIG. 7 in the direction of the arrows;

FIG. 10 is a sectional view taken along the line 10—10 in FIG. 9 in the direction of the arrows;

DETAILED DESCRIPTION

Figure 1A:
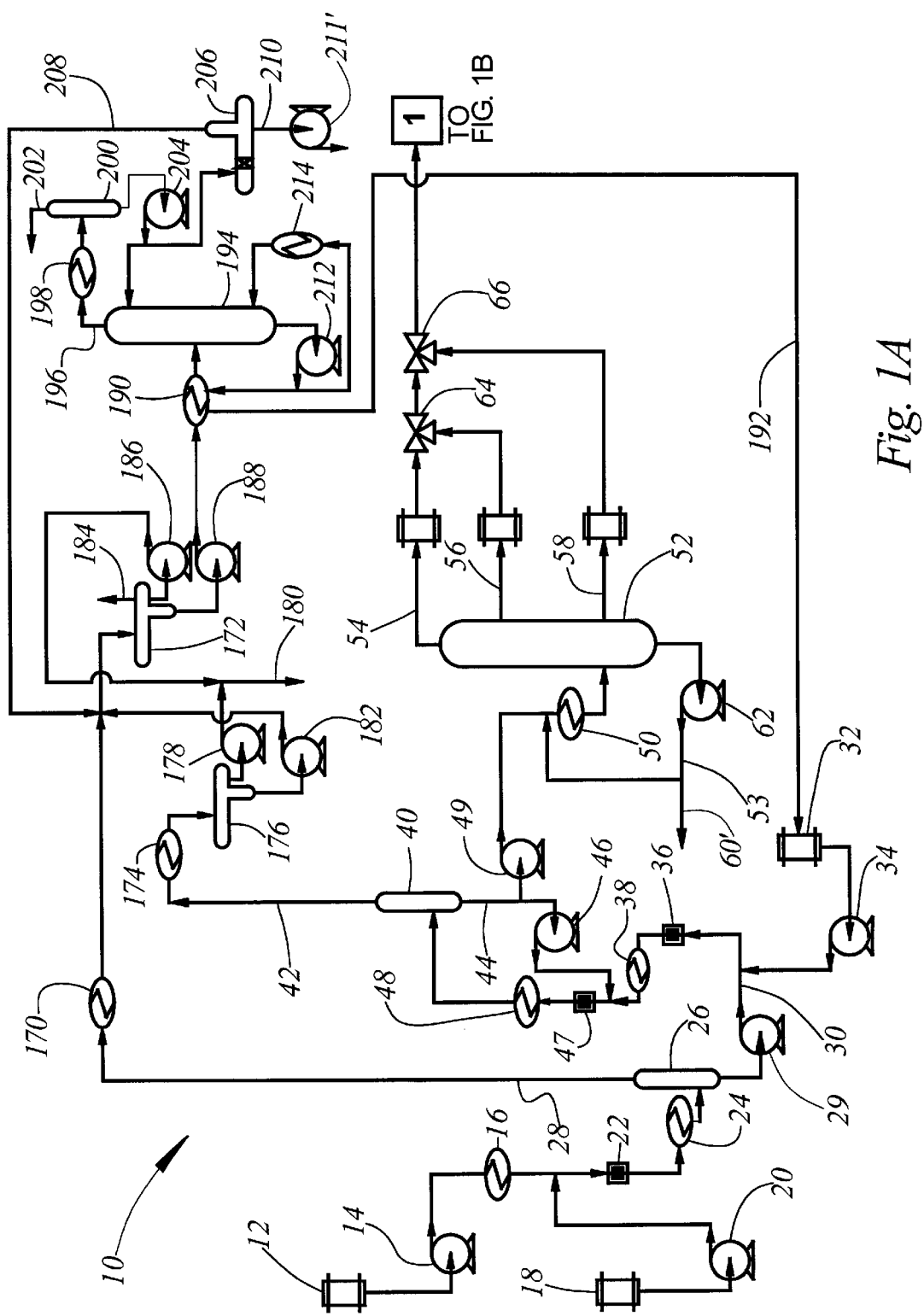
FIG. 1A is the first part of a diagrammatic illustration of a method of removing contaminants from petroleum distillates comprising the preferred embodiment of the invention.

The process of the present invention removes acidic compounds and color from used motor oil and other petroleum distillates. Additionally, the process removes or substitutes hydrocarbons containing heteroatoms, namely chlorine, boron, phosphorous, sulfur and nitrogen from the used motor oil. In removing these classes of compounds and to neutralize organic acids, the process uses inorganic or organic bases. Further, the process is capable of removing polynuclear aromatic hydrocarbons from used motor oil. The process makes use of a class of catalysts known as phase transfer catalysts, which are employed in the process to facilitate the transfer of inorganic or organic bases to the substrate in the used oil.

Examples of phase transfer catalysts that may be utilized in the process include: quaternary ammonium salts, polyol ethers, glycols and crown ethers. Through either the base catalysis or the neutralization reactions, undesirable components of the distillate oil are most often converted to forms that are easily removed from the used oil through distillation. Components that are not removed from the distillate are transposed to forms that may remain in the distillate with no adverse effect on the oil quality.

The invention is capable of operating in either a batch mode or a continuous flow mode. When operated in the batch mode, used oil is contacted with a phase transfer catalyst and a base. Heat is applied and the mixture is vigorously stirred. After the appropriate reaction time, the base and catalyst are washed out of the used oil with water, after which the remaining oil is distilled. For best results in the batch process, the initial used oil should be wide cut oil prepurified by wide cut distillation.

When the process is operated in the continuous flow mode, the oil, base, and catalyst are heated and mixed in appropriate order, passing through heat exchangers, in-line mixers, and tanks as required to effectively treat the oil. The mixture is then passed directly to the distillation apparatus, where additional mixing occurs and the catalyst and resulting oil are recovered as separate streams. The catalyst is recovered in a highly purified form and may be reused.

Although other phase transfer catalysts can be used in the process, the use of ethylene glycol is preferred because, when ethylene glycol is used, the source of the catalyst can be used glycol-based engine coolants. Thus, the catalyst can be acquired in raw form with little, if any, expenditure.

Following removal of the catalyst and distillation of the lubricating oil cuts, the distilled oil is directed to a liquid/liquid extraction apparatus. The distillate and a solvent, preferably a higher polar organic solvent such as N,N-dimethylformamide are counter-flowed through the extraction apparatus, whereby the solvent removes contaminants from the distillate. Typical types of extraction devices include mixer/settler combinations, non-agitated columns, and agitated columns. The following discussion assumes the use of a Karr column, which is an agitated column design.

Figure 1B:
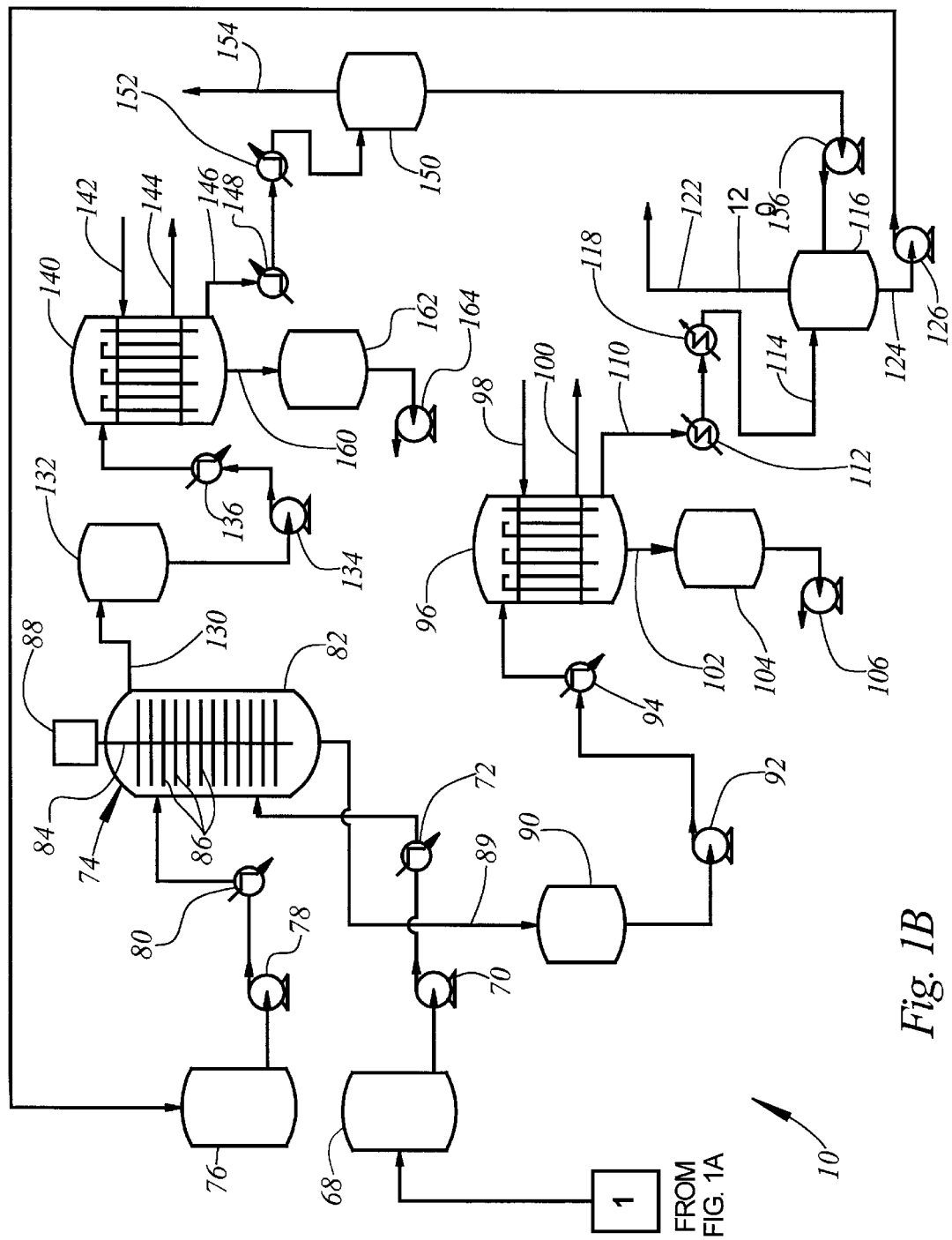
FIG. 1B is a continuation of FIG. 1A.

A process for removing contaminants from used motor oil 10 comprising a continuous flow process is shown in FIGS. 1A and 1B. In the process 10, the used oil from a source 12 is passed through a used oil feed pump 14 to a heater 16. At the same time, an aqueous solution of a base, e.g., a 50% aqueous solution of sodium or potassium hydroxide, is directed from a source 18 through a base feed pump 20 and into the used oil after it passes through and is heated to 70 to 125° C. by the heater 16. The amount of base added to the used oil is such that the concentration of base in the oil, on a dry weight basis, is between 0.5 and 5 weight percent. The used oil and base pass through an in-line mixer 22 and a heater 24, heating the mixture to between about 110° and about 160° C. The used oil mixture is then passed into a water flash drum 26 where water and a small amount of naphtha are removed through flash outlet 28. The water flash drum is best operated at low positive pressure, e.g., 0.8 to 1.1 barg., thus allowing a higher feed temperature to promote the reactions. However, in principle the flash drum could operate under vacuum. The resultant dehydrated used oil mixture is then removed from the water flash drum 26 through a pump 29 and a flash oil outlet 30.

A phase transfer catalyst from a source 32 is passed through a catalyst feed pump 34 and into the dehydrated used oil mixture. The amount of phase transfer catalyst that is added to the used oil is such that the concentration of catalyst in the resulting mixture ranges from 1 to 10 weight percent of the used oil. The used oil feed pump 14, the caustic feed pump 20, and the catalyst feed pump 34 are each engaged at flow rates that provide the desired amounts of each material. The used oil mixture is passed through an in-line mixer 36 and a heater 38, where it is heated to between about 275° and about 350° C., blended with the recycled bottoms stream from recycle pump 46, passed through an in-line mixer 47, heated in a heater 48, and directed into a stage I evaporator 40. Heating the mixture beyond 350° C. is not recommended as temperatures above 350° C. can result in excessive cracking of the used oil molecules. The stage I evaporator is typically operated under vacuum, with pressures ranging from about 150 to about 300 millimeters of mercury. The catalyst and light hydrocarbons are removed through flash catalyst outlet 42 and the oil is removed through oil outlet 44. Part of the oil passes through a recycle pump 46 and back into the dehydrated used oil mixture after the in-line mixer 36, but before the heater 48.

The remainder of the oil passes through a stage II feed pump 49 and a heater 50, where it is heated to between about 300° and about 350° C., and into a stage II evaporator 52. The stage II evaporator operates under vacuum with pressures ranging from about 0.5 to about 5 millimeters of mercury. The stage II evaporator may be operated at lower temperatures, but this will result in a lower yield of the heavier base oil product. The stage II evaporator separates the oil into three fractions, the viscosities of which depend upon the used oil feed. The table below lists products from a typical used oil feed:

| Fraction | Color | Chlorine | Viscosity @ 40° C. |
|---|---|---|---|
| light base oil | <0.5 | <5 ppm | 100 SUS |
| medium base oil | <1.0 | <5 ppm | 150 SUS |
| heavy base oil | <1.5 | <5 ppm | 300 SUS |
| still bottoms | n/a | n/a | n/a |

The light base oil is recovered through outlet 54, the medium base oil through outlet 56, the heavy base oil through outlet 58, and the still bottoms through outlet 60.

The still bottoms resulting from the simultaneous combination of the catalyzed base treatment with distillation yields important properties when combined with asphalt. In general, the still bottoms comprise a high value asphalt modifier, capable of extending the useful temperature range of most straight run asphalts. Specifically, the still bottoms impart favorable low temperature characteristics to asphalt, while maintaining the high temperature properties of the asphalt.

Part of the still bottoms are directed through a pump 62 and are recirculated through a line 53 and the heater 50 into the stage II evaporator. The light base oil, medium base oil, and heavy base oil each flow to a dedicated holding tank. Each of the base oils is fed to the extraction section in sequence in blocked operation, i.e. a tank of light base oils processed, then a tank of medium base oil, then a tank of heavy base oil, then the cycle repeats.

Referring to FIG. 1B, the oil is directed through a tank 68, a pump 70, and a heat exchanger 72 to the bottom of an extraction apparatus 74, such as a Karr column. Simultaneously a solvent is directed from a source 76 through a pump 78 and through a heat exchanger 80, which increases the temperature of the solvent, to the top of the Karr column 74. The solvent which is utilized in the practice of the invention preferably comprises a highly polar organic solvent, such as N,N-dimethylformamide (DMF). Other solvents in the class (e.g. acetonitrile) may also be used in the practice of the invention. The polarity of the solvent may be adjusted by the addition of water and/or other materials depending upon the requirements of particular applications of the invention.

The Karr column 74 comprises a tank 82 having a rod 84 vertically disposed therein. A plurality of shelves 86 are secured to the rod 84 for vertical reciprocation thereby. The rod 84 extends to an actuator 88 which functions to reciprocate the rod 84 and the shelves 86 vertically at a predetermined rate.

Each of the shelves 86 has a plurality of holes formed therethrough. Because the solvent from the source 76 is relatively more dense, it tends to move downward in the tank 82 relative to the upward moving petroleum. Conversely, because the petroleum distillate is relatively less dense, it tends to move upward in the tank 82 relative to the solvent. The vertical reciprocation of the shelves 86 and the fact that the shelves 86 have holes therethrough thoroughly mixes the upward moving petroleum distillate and the downward moving solvent. By this means the solvent functions to extract contaminants which are present in the petroleum distillate therefrom, and to carry the extracted contaminants downward out of the tank 82.

The solvent having the contaminants from the petroleum distillate dissolved therein is recovered from the tank 82 through an outlet 89 and is directed to a surge tank 90. From the surge tank 90 the solvent/contaminant solution is directed through a pump 92 and through a heat exchanger 94, which increases the temperature of the solution, to a falling film evaporator 96.

The falling film evaporator 96 is heated by a heating medium, e.g. steam or thermal oil, which is received through an inlet 98 and recovered through an outlet 100. The falling film evaporator 96 functions to evaporate the solvent, thereby separating the solvent from the contaminants dissolved therein. The contaminants are recovered from the falling film evaporator 96 through an outlet 102. The contaminants flow through a surge tank 104 to a pump 106 for which directs the contaminants to suitable utilization apparatus. For example, the contaminants may be directed to an asphalt storage tank, or blended into plant fuel and burned.

The solvent is recovered from the falling film evaporator 96 through an outlet 110 and is directed to heat exchangers 112 and 118 which remove heat from the solvent. Solvent from heat exchanger 118 is directed through an outlet 114 to a surge tank 116. Noncondensable material which remains in the vapor phase is directed to a vent 122. Solvent from the surge tank 116 is directed through an outlet 124 to a pump 126 which returns the solvent to the source 76.

Petroleum distillate having the contaminants removed therefrom is recovered from the tank 82 through an outlet 130 and is directed to a surge tank 132. From the surge tank 132 the petroleum distillate is directed through a pump 134 and through a heat exchanger 136, which adds heat to the petroleum distillate, to a falling film evaporator 140. The falling film evaporator 140 is actuated by steam or thermal oil which is received through an inlet 142 and recovered through an outlet 144.

The falling film evaporator 140 functions to remove any remaining solvent from the petroleum distillate. The solvent is recovered from the falling film evaporator 140 through an outlet 146 and is directed to heat exchangers 148 and 152 which remove heat from the solvent. Solvent recovered from the heat exchanger 152 is directed to a surge tank 150. Noncondensable material remaining in the vapor phase is directed to a vent 154. Liquid solvent from the surge tank 150 is directed to a pump 156 which returns the solvent to the source 76 through the tank 116 and the pump 126.

Petroleum distillate having substantially all polynuclear aromatic hydrocarbons, sulphur-containing substances and nitrogen-containing substances and other contaminants removed therefrom is recovered from the falling film evaporator 140 through an outlet 160. The petroleum distillate passes through a surge tank 162 and from the surge tank 162 to a pump 164 which directs the petroleum distillate to storage facilities and/or further processing apparatus.

Referring particularly to FIG. 1A, the water, any glycol contained in the used oil feed, and light hydrocarbons from the flashdrum 26 are directed through the outlet 28 to a condenser 170, and from the condenser 170 to a liquid/liquid separator 172. The catalyst and light hydrocarbons from the stage I evaporator are directed through the vapor outlet 42 and through a condenser 174 to a liquid/liquid separator 176. The less dense liquid from the separator 176 is directed through a pump 178 and is recovered at an outlet 180. The heavier liquid from the separator 176 is directed through pump 182 to the separator 172.

Vapors and gases from the separator 172 are vented at an outlet 184. Less dense liquid from the separator 172 is directed through a pump 186 and is recovered at the outlet 180. More dense liquid from the separator 172 is directed through a pump 188 to a heater 190 where the heavy liquid recovers heat from the dry catalyst leaving the bottom of the distillation tower 194. Cooled dry catalyst from the heater 190 comprises dry catalyst which is returned to the source 32 through a line 192. The heated heavy liquid from the heater 190 is directed through a distillation tower 194.

The distillation tower 174 separates the feed into low boiling and high boiling cuts. The low boiling cut is directed through an outlet 196 through a condenser 198, and from the condenser 198 to a receiver 200. Gases are vented from the receiver 200 through outlet 202. Liquid from the receiver 200 is directed to a pump 204. Part of the output of the pump 204 is returned to the distillation tower 194 as reflux. The remainder of the output of the pump 204 is directed to a coalescer 206. Light liquid from the coalescer 206 is directed to the separator 172 through a line 208. Waste water is recovered from the coalescer 206 through an outlet 210 and a pump 211.

The heavy cut from the distillation tower 194 is directed to a pump 212. Part of the output of the pump 212 is directed to the heater 190. The remainder of the output from the pump 212 is directed through a heater 214 and is returned to the distillation tower 194.

Figure 2A:
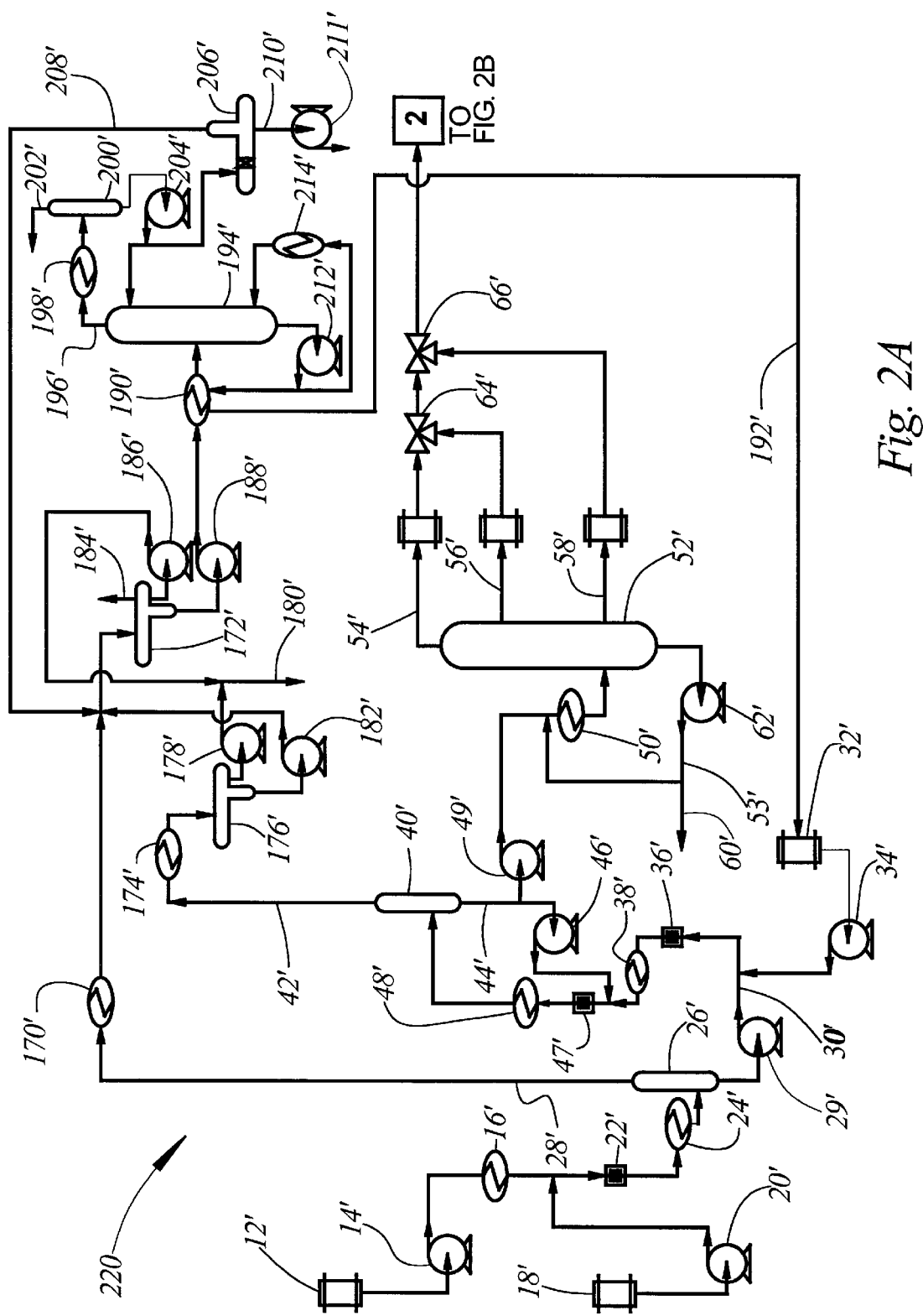
FIG. 2 is the first part of a diagrammatic illustration of a method of removing contaminants from petroleum distillates comprising a variation of the preferred embodiment.
FIG. 2B is a continuation of FIG. 2A.
Figure 2B:
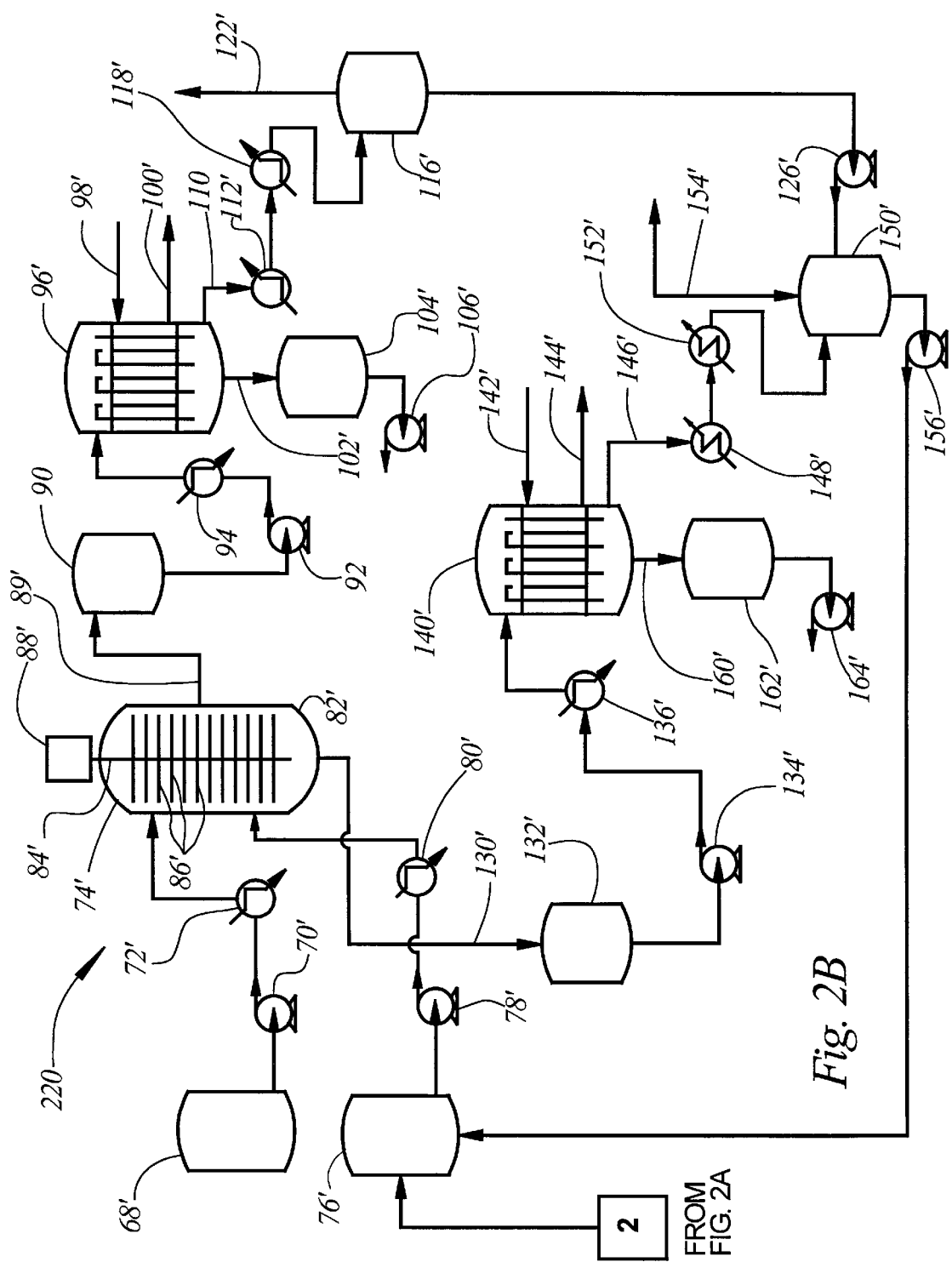

FIGS. 2A and 2B illustrate a system 220 for removing polynuclear aromatic hydrocarbons and other contaminants from petroleum distillate comprising a second embodiment of the invention. The system 220 includes numerous component parts which are substantially identical in construction and function to the component parts of the system 10 illustrated in FIGS. 1A and 1B and described hereand above in connection therewith. Such identical component parts are designated in FIGS. 2A and 2B with the same reference numerals utilized above in the description of the system 10, but are differentiated thereof by means of a prime (') designation.

The system 220 of FIGS. 2A and 2B differ from the system 10 of FIGS. 1A and 1B in that the system 220 is utilized in those instances in which the solvent is lighter, i.e., less dense, than the petroleum distillate. In such cases the solvent is directed to the bottom of the tank 82' and is recovered from the top thereof after extracting the polynuclear aromatic hydrocarbons from the petroleum distillate. Conversely, the petroleum distillate is directed to the top of the tank 82' and is recovered from the bottom thereof following removal of the polynuclear aromatic hydrocarbons and other contaminants from the petroleum distillate by the action of the solvent. Otherwise, the operation of the system 300 of FIGS. 2A and 2B is virtually identical to the operation of the system 10 of FIGS. 1A and 1B.

Figure 3:
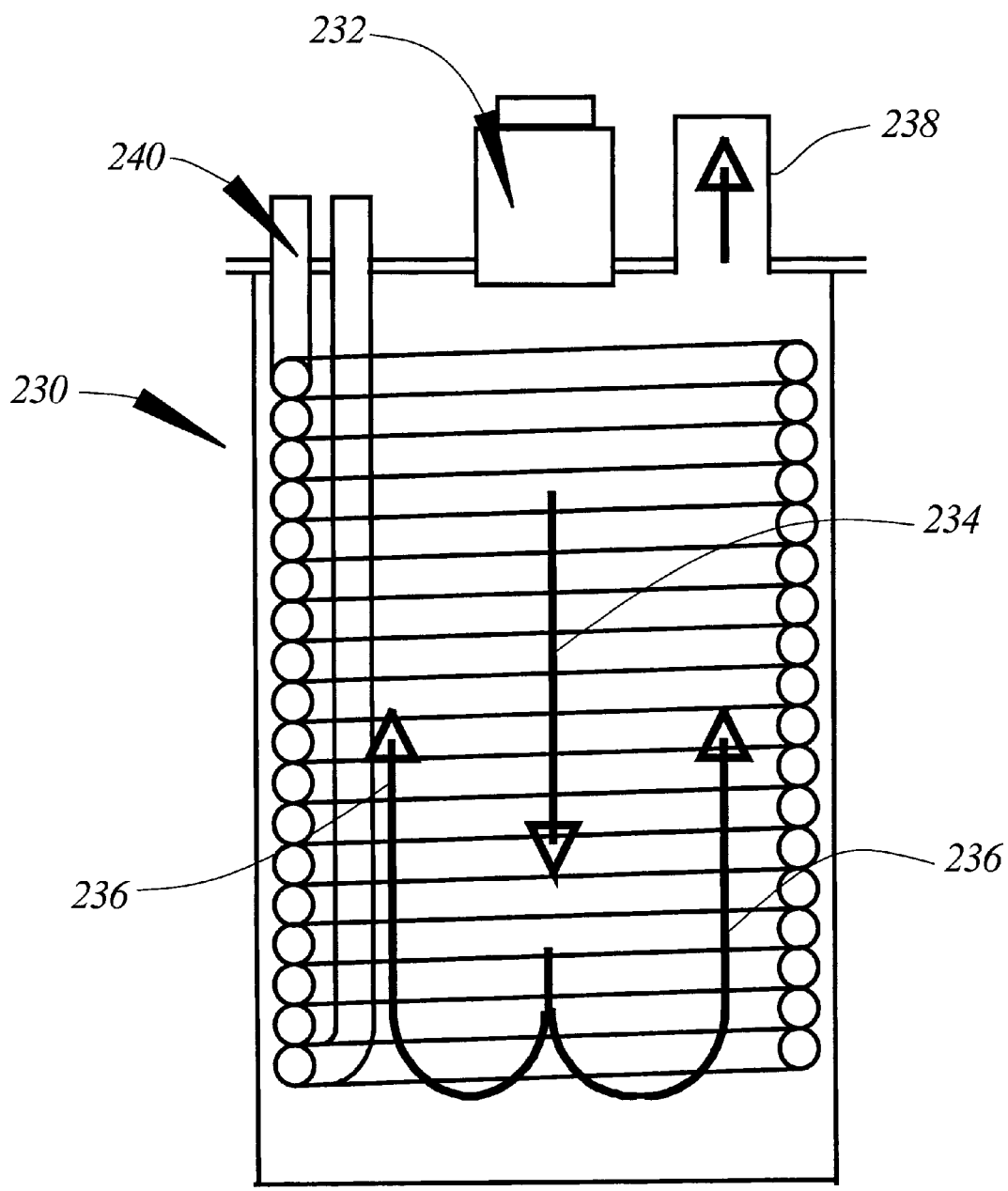
FIG. 3 is a diagrammatic illustration of a prior art heater.

Referring to FIG. 3, there is shown a heater 230 of the type utilized in prior art systems for re-refining used motor oil and similar petroleum distillates as exemplified by Kenton U.S. Pat. No. 5,814,207 granted Sep. 29, 1998. The heater 230 includes a burner 232. Heated gas is generated by the burner 232 flow in the direction of the arrows 234 and 236 and are eventually exhausted through an outlet 238. The burner 232 and the gases generated thereby are employed to heat fluids passing through piping 240 which is configured as a helical coil.

Experience has proven that the prior art heater 230 is inefficient in operation. Therefore, a need exists for a more efficient heater design for use in the method and apparatus in the present invention. By means of a more efficient heater design, the amount of fuel necessary to operate the method and apparatus of the present invention is reduced and the efficiency of operation is therefore improved.

Figure 4:
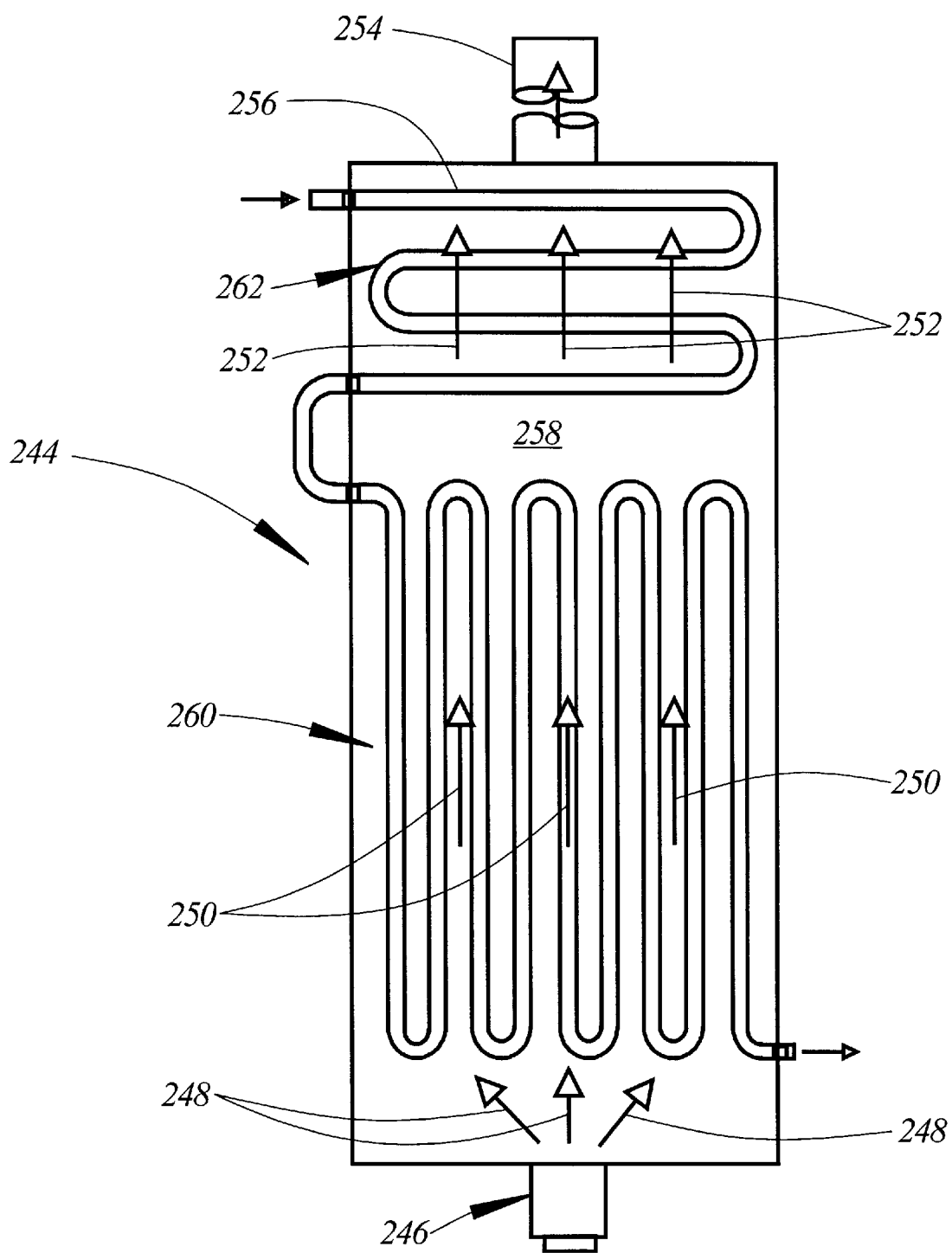
FIG. 4 is a diagrammatic illustration of the heater utilized in the practice of the present invention.

Referring to FIG. 4, there is shown a heater 244 which is used in the method and apparatus of the present invention in lieu of the heater 230. The heater 244 includes a burner 246. The burner 246 generates heated gases which flow through the heater 244 in the direction of the arrows 248, 250, and 252 and which are eventually exhausted from the heater 244 through an outlet 254. The heater 246 and the heated gases generated thereby are employed to heat fluids flowing through piping 256.

The piping 256 of the heater 244 is mounted in a spaced apart relationship with respect to the adjacent wall 258, thereby permitting the heated gases generated by the burner 246 to flow around the entire periphery of the piping 256. The heater 244 comprises two sections including a radiant section 260 wherein the piping 256 extends generally parallel to the direction of flow of the heated gases generated by the burner 246 as represented by the arrows 250, and a convection section 262 wherein the piping 256 extends generally perpendicular to the direction of flow of the heated gases generated by the burner 246 is represented by the arrows 252. In actual practice it has been found that the heater 244 is substantially more efficient than the heater 230 as illustrated in FIG. 3 and described hereinabove in conjunction therewith.

Figure 5:
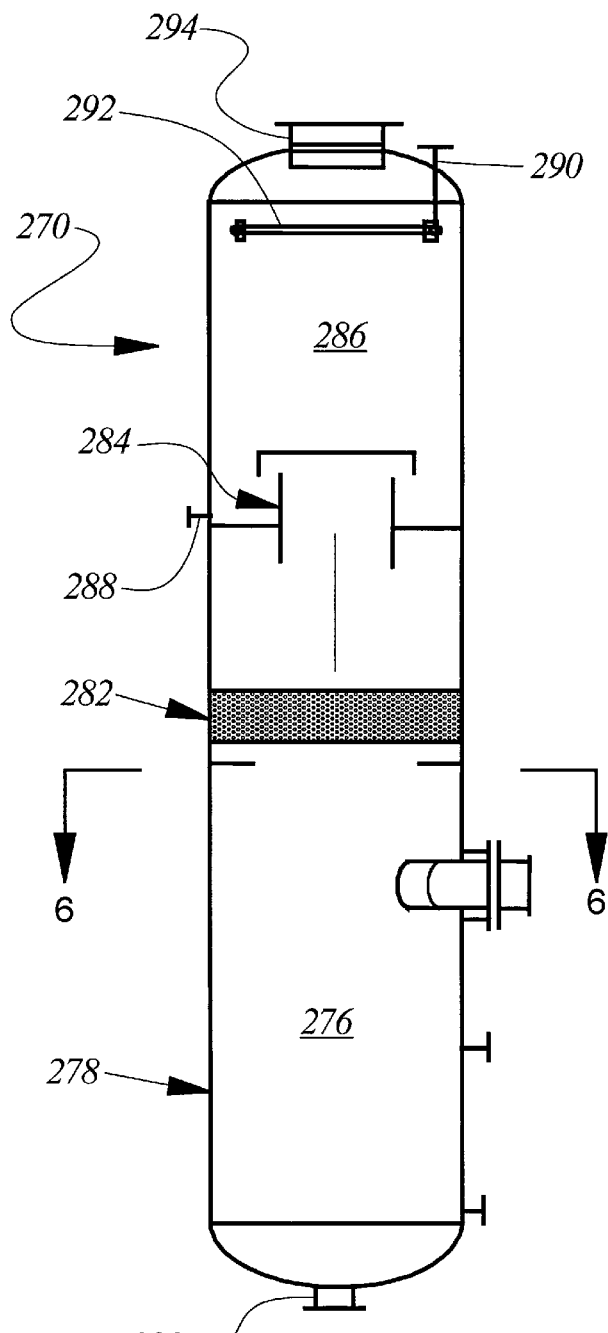
FIG. 5 is a diagrammatic illustration of a prior art liquid/vapor separator.
Figure 6:
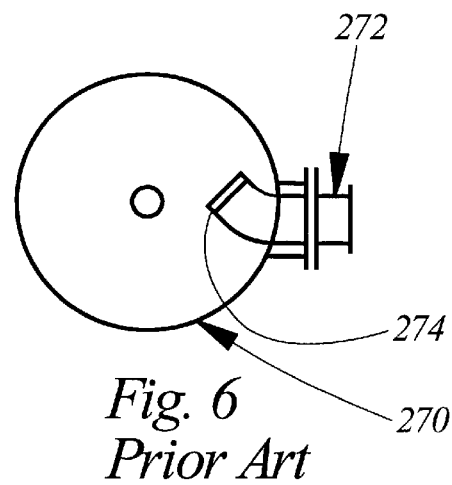
FIG. 6 is a sectional view taken along the line 6—6 in FIG. 5 in the direction of the arrows.

FIGS. 5 and 6 illustrate a prior art liquid/vapor separator 270 of the type utilized in the above-identified Kenton U.S. Pat. No. 5,814,207. As is best shown in FIG. 6, the separator 270 includes an inlet 272 which receives a fluid including liquid and vapor portions. The inlet 72 extends to a 45° elbow 274 which discharges the fluid into a flash zone 276 comprising the lower portion of a vessel 278.

The liquid portion of the received fluid collects in the bottom of the flash zone 276 and is recovered through an outlet 280. The vapor portion of the fluid passes through a demister 282 which comprises a knitted mesh pad. The vapor then passes through a vapor chimney 284 and into a spray condenser portion 286 of the vessel 278.

Within the spray condenser portion of the vessel 278, the vapor portion of the received fluid is condensed and is recovered as a liquid through an outlet 288. A portion of the recovered liquid is cooled and is returned to the spray condenser portion of the vessel 288 through an inlet 290. The cooled liquid is discharged from a spray header 292 and functions to cool the vapor within the spray condenser portion 286. Air and any uncondensed vapor is recovered through an outlet 294.

In actual practice the liquid/vapor separator 270 has been found to be inefficient in separating vapor and liquid, carrying over a substantial amount of liquid with the vapor. Therefore, a need exists for a more efficient liquid/vapor separator. The use of a more efficient liquid/vapor separator results in greater overall efficiency in the operation of the method and apparatus of the present invention.

Referring to FIGS. 7, 8, 9, and 10 illustrate a liquid/vapor separator 300 which is substantially more efficient in operation as compared with the liquid/vapor separator 270. The liquid/vapor separator 300 includes a vessel 302. An inlet 304 extends to a fluid discharge member 306 situated in the lower portion of the vessel 302. As is fully illustrated in FIGS. 7 and 8, the fluid discharge member 306 comprises a rectangular passageway which extends tangentially around the interior circumference of the vessel 302 and simultaneously angles downward. The shape and configuration of the fluid discharge member 306 causes the received fluid to spiral downward around the interior of the wall of the vessel 302 thereby substantially increasing the efficiency of the separation of the vapor portion from the liquid portion of the received fluid.

The liquid portion of the received fluid accumulates in the bottom of the vessel 302 and is recovered through an outlet 308. The vapor portion of the received fluid moves upward in the vessel 302 through a multiplicity of riser chimneys 310 which are arranged as illustrated in FIGS. 9 and 10. The vapor portion of the received fluid then passes into the upper portion of the vessel 302 wherein the vapor is condensed to liquid. The liquid accumulates in a sump 312 and is recovered through an outlet 314.

A portion of the recovered liquid is cooled and is returned to the vessel 302 through an inlet 316. The cooled liquid is discharged through a plurality of spray nozzles 318, thereby condensing the vapor in the upper portion of the vessel 302 to liquid.

An important feature of the liquid/vapor separator 300 comprises a disengaging volume 320 situated above the spray nozzles 318. The disengaging volume 320 allows the contents of the vessel 302 situated above the spray nozzles 318 to achieve a quiescent state, thereby assuring the recovery of all liquid and preventing liquid from being entrained in gases which are exhausted from the vessel 302 through an outlet 322.

Figure 11:
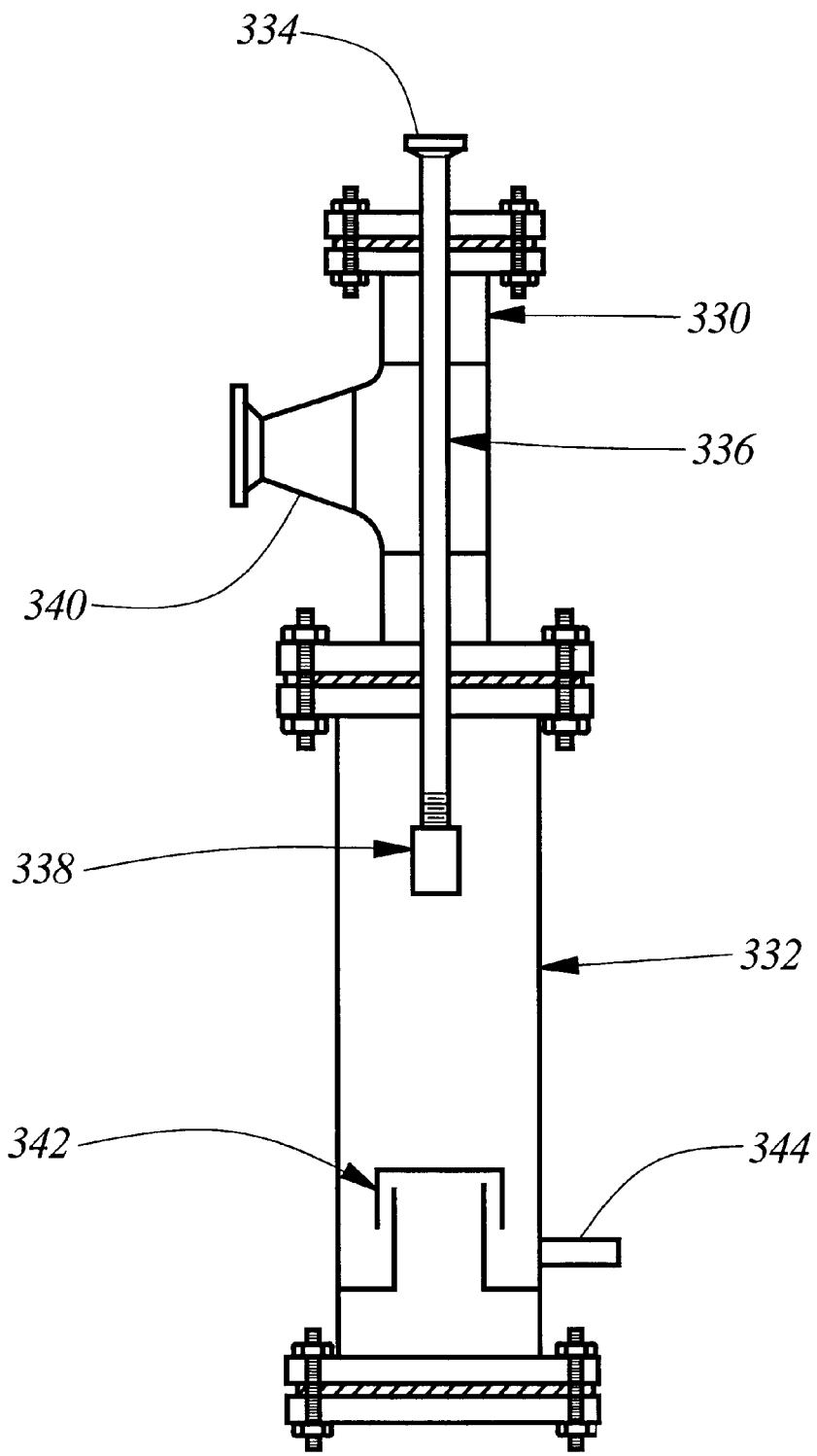
FIG. 11 is a diagrammatic illustration of a spray condenser useful in the practice of the invention.

FIG. 11 illustrates an additional spray condenser 330 which may be mounted on top of the outlet 322 of the vessel 302 of the liquid/vapor separator 300. A pipe section 332 extends upwardly from the outlet 322. Cooled liquid is received through an inlet 334 and travels downwardly through a pipe 336 to a spray nozzle 338. The liquid is sprayed from the nozzle 338 thereby further reducing the temperature of the material that is exhausted from the vessel 302 of the liquid/vapor separator 300 thereby removing any liquid therefrom.

Gases and vapors enter the pipe section 332 through a chimney 342. Condensed liquid is recovered through an outlet 344. Part of the condensed liquid is cooled and directed through the inlet 334 to the spray nozzle 338.

Figure 12:
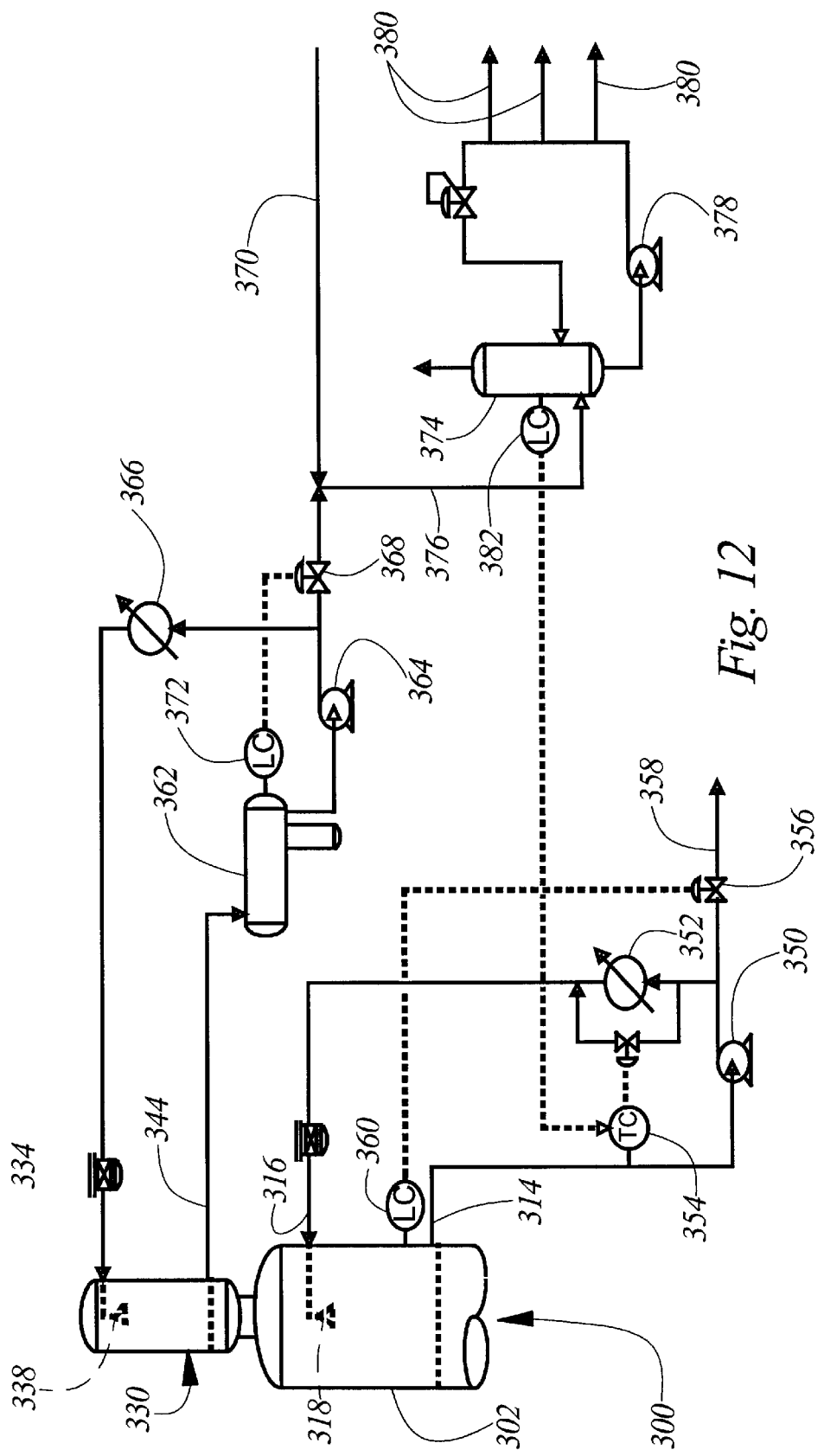
FIG. 12 is a diagrammatic illustration of a system for providing cooled condensate to the spray condensers utilized in the practice of the invention and for maintaining an adequate quantity of fuel in the fuel supply tank utilized in the practice of the invention.

The operation of the liquid/vapor separator 300 and the operation of the spray condenser 330 are further illustrated in FIG. 12. Liquid recovered through the outlet 314 of the liquid/vapor separator 300 is directed to a pump 350. From the pump 350 the liquid flows through a heat exchanger 352. From the heat exchanger 352 the liquid is returned to the vessel 302 through the inlet 316 and is discharged from the spray nozzles 318. Operation of the heat exchangers 352 is regulated by a temperature controller 354 which assures that liquid is discharged from the spray nozzles 318 at the proper temperature.

As will be appreciated by those skilled in the art, it is not necessary to return all of the liquid that is recovered from the liquid/vapor separator 300 to the spray nozzles 318. Rather, part of the output from the pump 350 is directed through a valve 356. From the valve 356 the excess liquid is directed to storage through piping 358. Operation of the valve 356 is regulated by a level controller 360.

At least part of the material that is recovered through the outlet 344 of the spray condenser 330 is naphtha. As is well known, naphtha is useful as a fuel. In the practice of the present invention, the recovered naphtha is added to the supply of fuel which is utilized in the operation of the heaters which are in turn employed in the method and apparatus of the invention, thereby reducing fuel costs.

The outlet 344 extends to a receiver 362. From the receiver 362 the naphtha is directed to a pump 364. Part of the outlet of the pump 364 is directed to a heat exchanger 366 which reduces the temperature of the material passing therethrough. From the heat exchanger 366, the naphtha is directed through the inlet 334 and is discharged from the spray nozzle 338.

As will be appreciated by those skilled in the art, it is not necessary to return all of the naphtha to the spray condenser 330. The remaining output of the pump 364 is directed through a valve 368 and is combined with polynuclear aromatics which are extracted from used motor oil and similar petroleum distillates in the practice of the present invention and which are received through a line 370. Operation of the valve 368 is regulated by a level controller 372.

The naphtha from the pump 364 and the polynuclear aromatics from the line 370 are directed to a fuel supply tank 374 through a line 376. From the fuel supply tank 374, fuel is directed through a pump 378 to a plurality of outlets 380 each of which extends to one of the heaters utilized in the practice of the invention.

A level controller 382 monitors the amount of fuel in the fuel supply tank 374. Whenever additional fuel is required, the level controller 382 actuates the temperature controller 354 thereby raising the operating temperature within the liquid/vapor separator 300. Raising the operating temperature within the liquid/vapor separator 300 causes the production of additional naphtha. The additional naphtha is directed to the fuel supply tank 374 thereby increasing the amount of fuel within the fuel supply tank 374. When sufficient additional fuel has been received in the fuel supply tank 374, the level controller 382 actuates the temperature controller 354 to restore the original operating temperature of the liquid/vapor separator 300.

Figure 13:
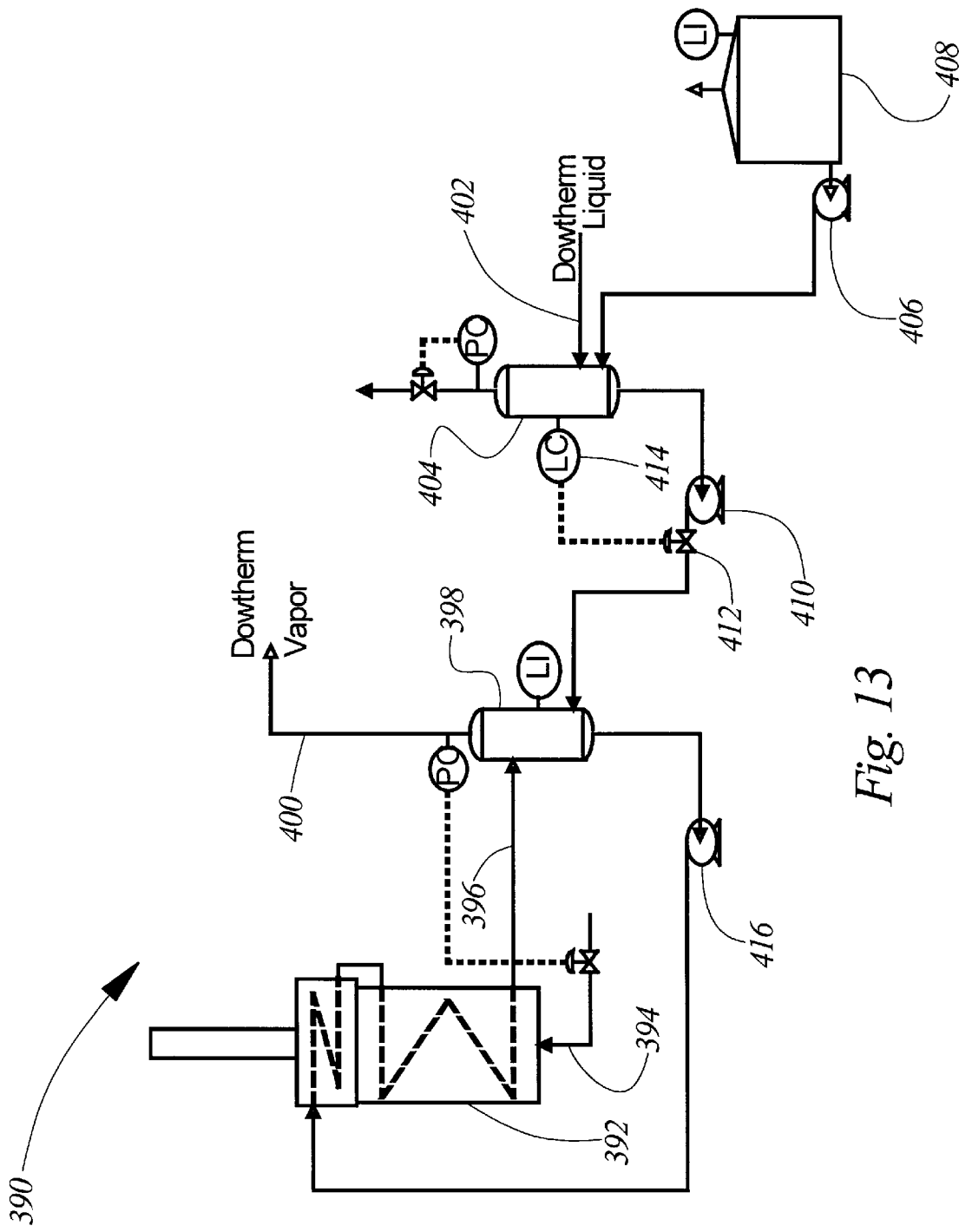
FIG. 13 is a diagrammatic illustration of a DOWTHERM® system utilized in the practice of the invention.

FIG. 13 illustrates a DOWTHERM® system 390 useful in the practice of the invention. The system 390 includes a DOWTHERM® vaporizer 392 which receives fuel from the fuel supply tank 374 of FIG. 12 through one of the outlets 380 which is coupled to an inlet 394 for the vaporizer 392.

The DOWTHERM® vaporizer 392 produces DOWTHERM® vapor which is directed through a line 396 to a DOWTHERM® vapor drum 398. From the drum 398, DOWTHERM® vapor is directed through a line 400 to various devices comprising the method and apparatus of the present invention which require heat. DOWTHERM® liquid from such devices is returned through a line 402 which extends to a flash drum 404. A pump 406 directs makeup DOWTHERM® liquid from a storage drum 408 to the flash drum 404.

A pump 410 directs DOWTHERM® liquid from the flash drum 404 to the DOWTHERM® vapor drum 398 through a valve 412. The valve 412 is regulated by a level controller 414. A pump 416 returns DOWTHERM® liquid from the DOWTHERM® vapor drum 398 to the DOWTHERM® vaporizer 392.

Figure 14:
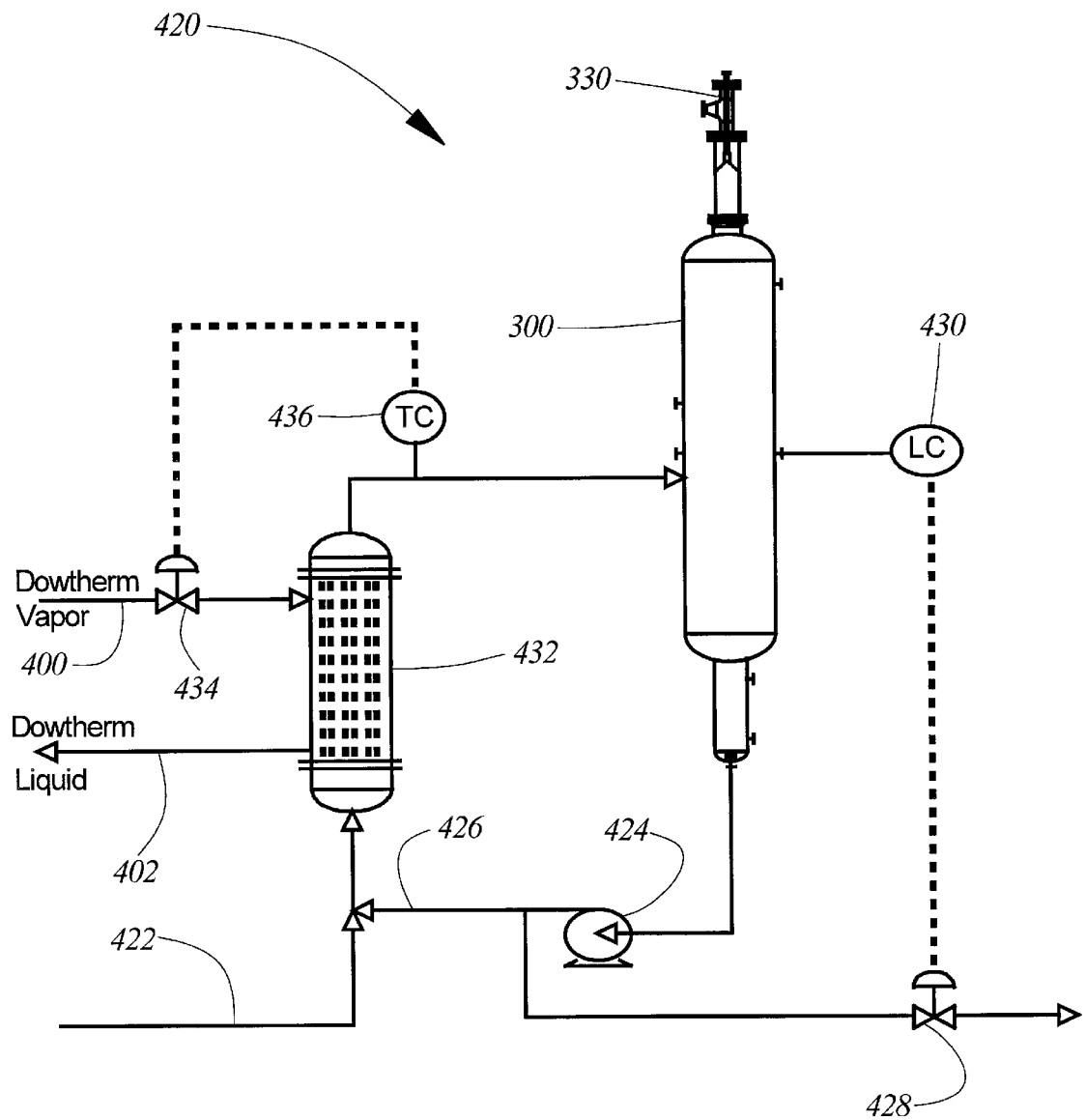
FIG. 14 is a diagrammatic illustration of a reboiler useful in the practice of the invention.

FIG. 14 illustrates a reboiler system 420 useful in the practice of the invention. The reboiler system 420 is heated by condensing DOWTHERM® vapor received from the DOWTHERM® vaporizer 392 of FIG. 13 through the line 400. Spent DOWTHERM® liquid is returned from the reboiler system 420 through the line 402. The reboiler system 420 is utilized in the practice of the invention to heat the liquid which accumulates in the bottom of the liquid/vapor separator 300 thereby converting a portion of the accumulated liquid to vapor.

The reboiler system 420 receives feed from storage or from a preceding stage in the method and apparatus of the present invention through a line 422. A pump 424 withdraws liquid from the liquid/vapor separator 300. Part of the withdrawn liquid is directed to the reboiler system 420 through a line 426. The remainder of the withdrawn liquid is directed to the next stage comprising the method and apparatus of the present invention or to storage through a valve 428. Operation of the valve 428 is regulated by a level controller 430.

The reboiler system 420 comprises a heat exchanger 432 which receives DOWTHERM® vapor from the line 400 through a valve 434. Operation of the valve 434 is regulated by a temperature controller 436. The reboiler system 420 functions to maintain the temperature of the liquid within the liquid/vapor separator 300 within a predetermined range.

The use of the DOWTHERM® system of FIG. 13 in the operation of the reboiler system 420 comprises an important feature of the present invention. As will be appreciated by those skilled in the art, the contents of the liquid/vapor separator 300 are highly flammable. Assuming for a moment that the liquid within the liquid/vapor separator 300 were to be heated by a fuel burning heater, safety regulation would require that the heater be located a substantial distance from the liquid/vapor separator 300. Causing the liquid from the liquid/vapor separator 300 to travel long distances to and from the heater increases residence time at high temperature which increases thermal cracking and coking which would be detrimental to the efficient operation of the method and apparatus comprising the present invention.

Figure 15:
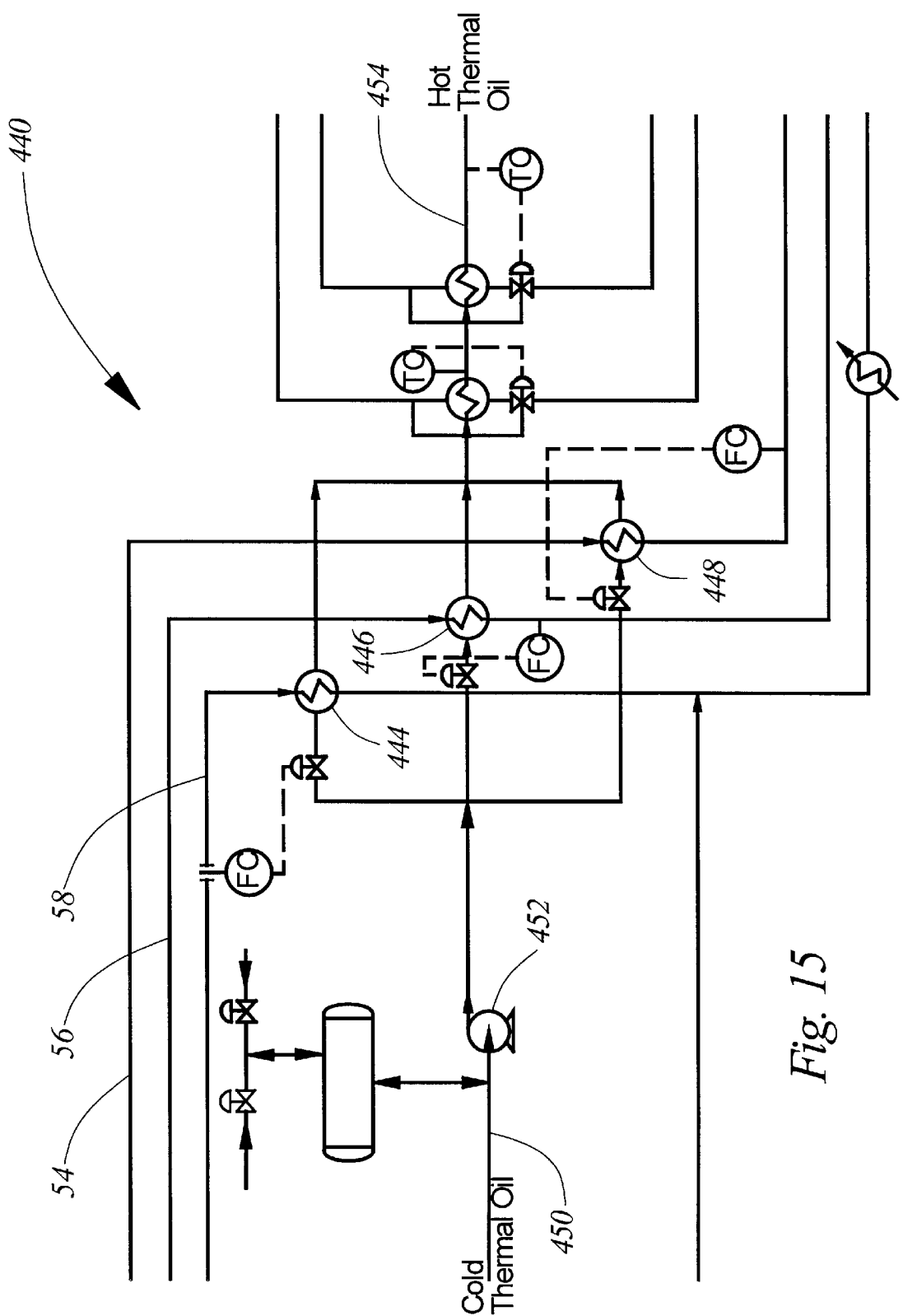
FIG. 15 is a diagrammatic illustration of a heat recovery system utilized in the practice of the invention.

FIG. 15 illustrates a heat recovery system 440 which further increases the efficiency of the method and apparatus comprising the present invention. Lines 54, 56, and 58 of FIG. 1A or lines 54', 56', and 58' of FIG. 2A are directed through heat exchangers 444, 446, and 448, respectively. Cold thermal oil is received through a line 450 and is forced through the heat exchanger 444, 446, and 448 by a pump 452. The heat exchangers 444, 446, and 448 function to cool the oil flowing through the lines 54, 56, and 58 while simultaneously heating the thermal oil received through the line 450. Exchangers 492 and 493 recover additional heat by cooling the medium base oil (490) and heavy base oil (491) recirculating streams that provide cooled oil to the spray condensing sections spray nozzles. In this manner hot thermal oil is supplied by the system 440 through a line 454.

Figure 16:
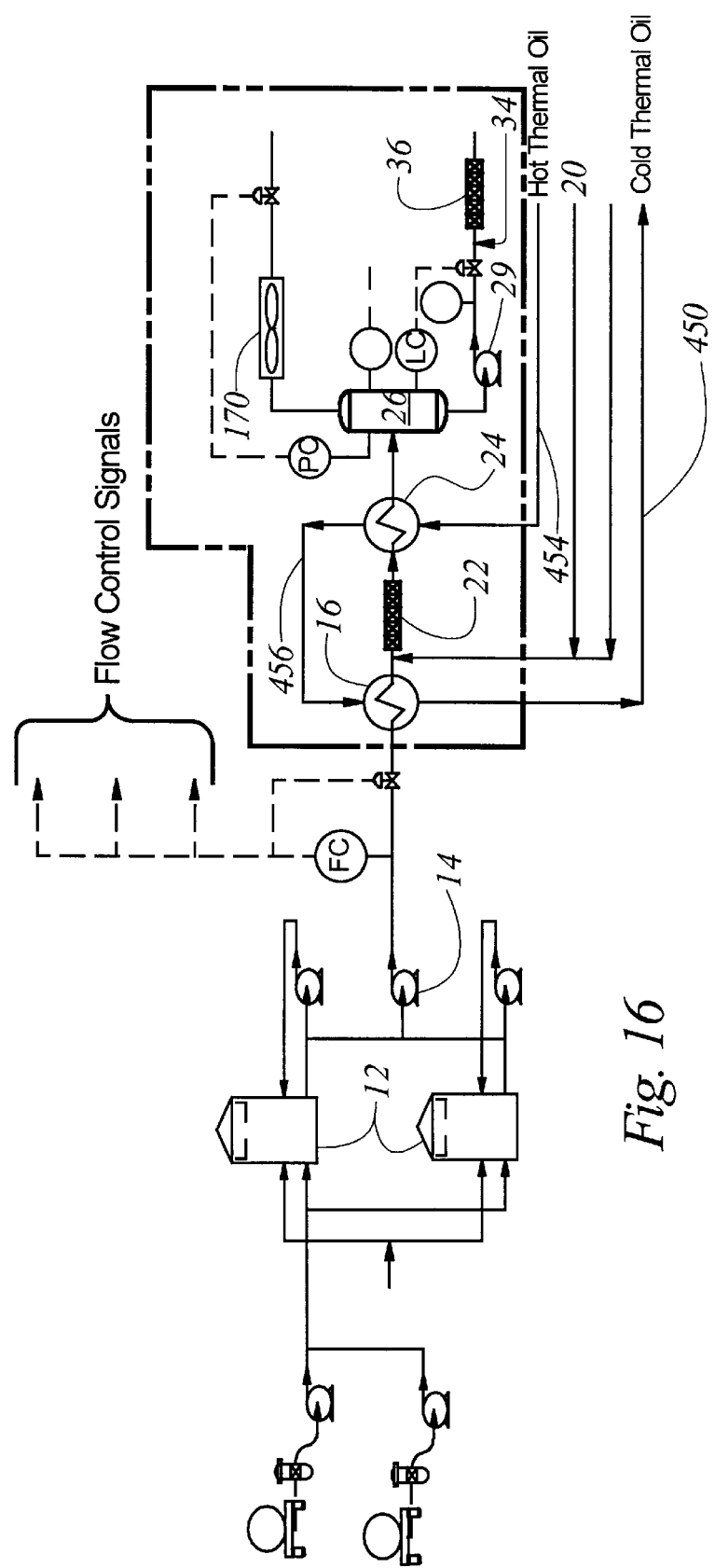
FIG. 16 is a further illustration of the heat recovery system.

FIG. 16 comprises a portion of FIG. 1A, it being understood that identical components are utilized in FIG. 2A. The hot thermal oil line 454 of FIG. 15 extends to the heat exchanger 24. From the heat exchanger 24, the hot thermal oil is directed through the heat exchanger 16 through a line 456. From the heat exchanger 416, the now cold thermal oil is returned through the line 450. In this manner heat recovered from the lines 54, 56, 58, 498 and 491 after processing of the used motor oil or similar petroleum distillate is utilized to heat the used motor oil or similar petroleum distillate at an earlier stage in the process.

Figure 17:
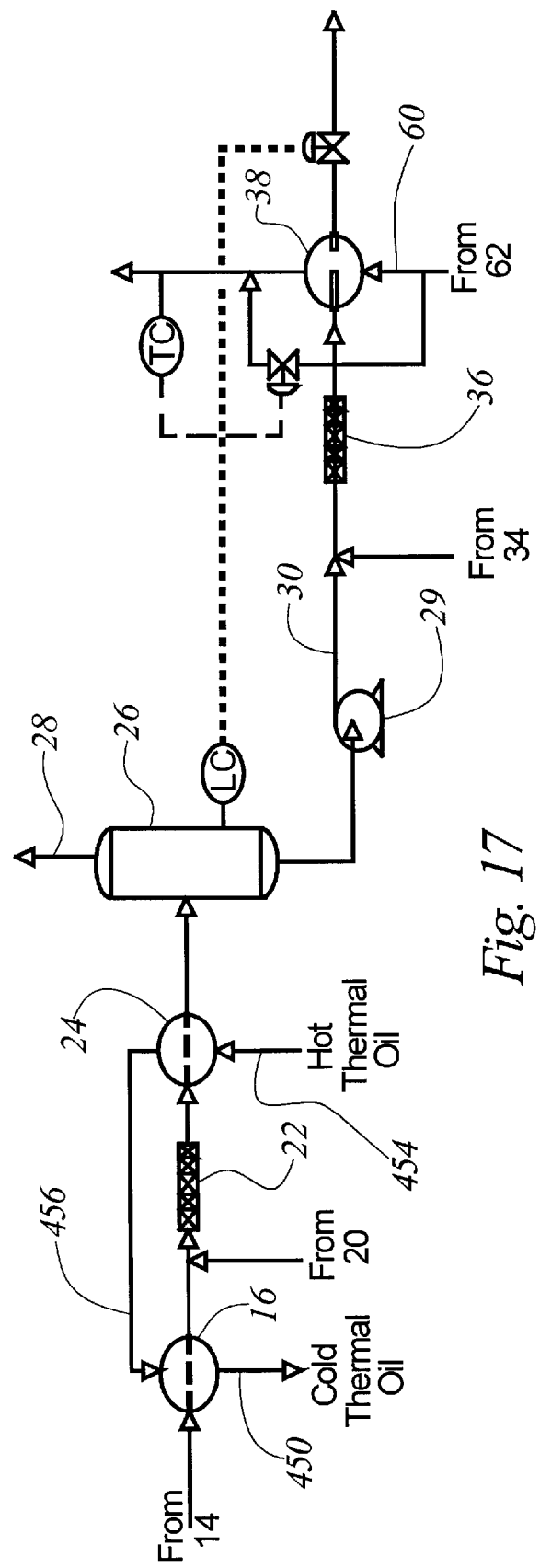
FIG. 17 is a diagrammatic illustration of another portion of the heat recovery system.

FIG. 17 comprises a further illustration of the conversation of heat in the operation of the method and apparatus comprising the present invention. The bottoms resulting from operation of the Stage II evaporator 52 are directed through a line 60 by the pump 62. The line 60 extends to the heat exchanger 38. The heat exchanger 38 functions to cool the material flowing through the line 60 while simultaneously heating the oil/caustic/catalyst mixture resulting from operation of the mixer 36. In this manner the oil/caustic/catalyst mixture is heated without requiring the use of additional fuel in doing so.

Figure 18:
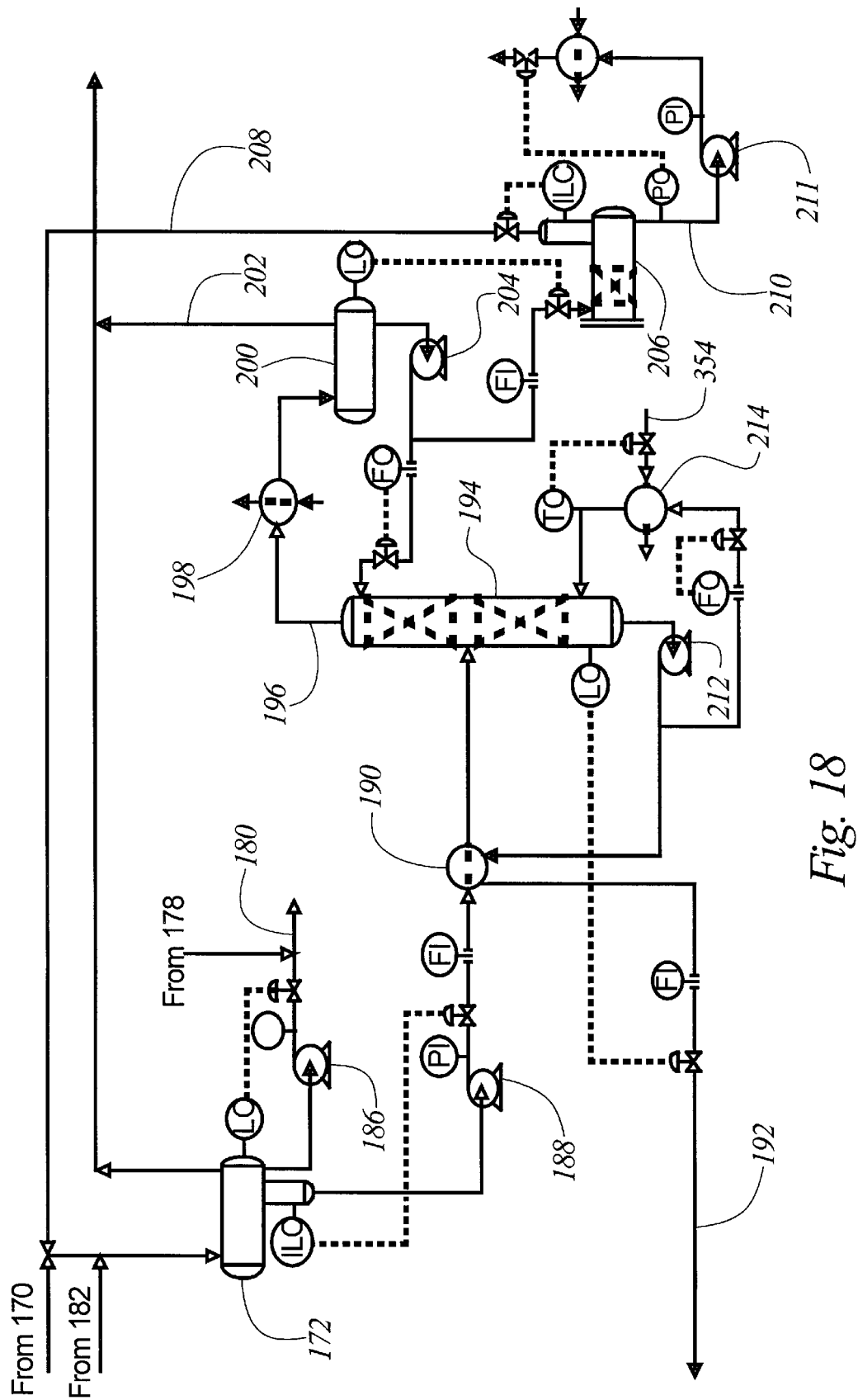
FIG. 18 is a more detailed illustration of the catalyst recovery system of the present invention as illustrated in FIGS. 1A and 2A.

FIG. 18 comprises a more detailed explanation of the catalyst recovery system utilized in the method and apparatus of the present invention. Although FIG. 18 comprises a portion of FIG. 1A, it will be understood that FIG. 18 is equally applicable to FIG. 2A.

Figure 19:
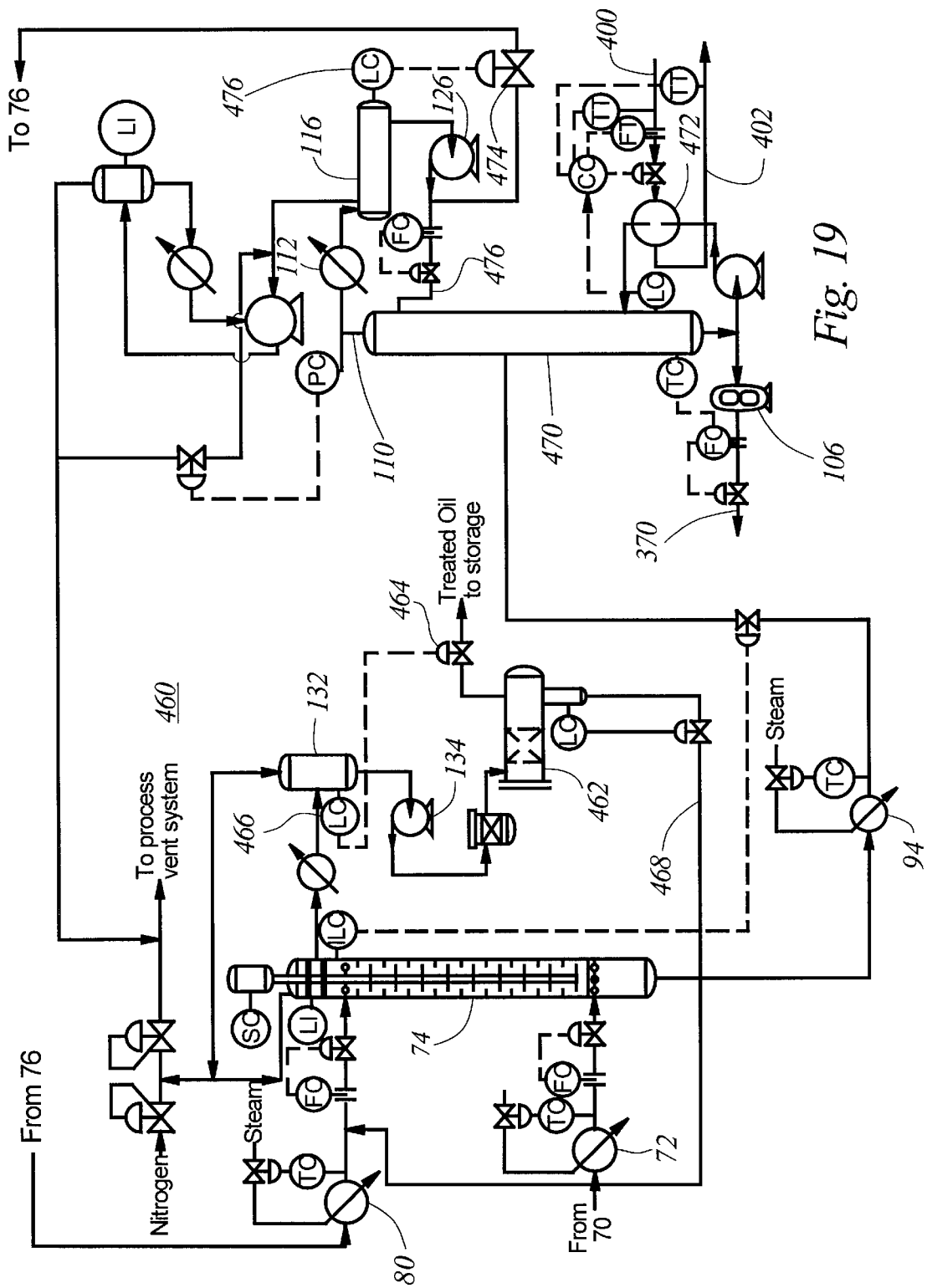
FIG. 19 is a diagrammatic illustration of an alternative solvent recovery system which may be utilized in the practice of the invention.

FIG. 19 illustrates a system 460 for removing polynuclear aromatics, nitrogen-containing substances, sulphur-containing substances, and similar contaminants from used motor oil and similar petroleum distillates. The system 460 incorporates various component parts which are substantially identical in construction and function to component parts of the system illustrated in FIG. 1B and described hereandabove in conjunction therewith. One difference between the system 460 and the system of FIG. 1B is that in lieu of the following film evaporator 140, the system 460 employs a coalescer 462 to receive the treated petroleum distillate from the pump 134. From the coalescer 462 treated oil is directed to storage through a valve 464 which is regulated a level controller 466. Solvent recovered from the coalescer 462 is returned to the extraction apparatus 74 through a line 468.

Another difference between the system 460 and that of FIG. 1B involves the fact that the system 460 utilizes a solvent recovery column 470 in lieu of the falling film evaporator 96. Heat is supplied to the solvent recovery column 470 by a reboiler 472 which is substantially identical to construction and function to the reboiler system 420 illustrated in FIG. 14.

The solvent recovery column 470 functions to evaporate the relatively volatile solvent leaving polynuclear aromatics and other contaminants in the bottom of the solvent recovery column. The evaporated solvent is directed to the heat exchanger 112 and from the heat exchanger to the solvent receiver 116 from the solvent receiver 116, the solvent is returned to the solvent storage tank 76 through a valve 474 which is regulated by a level controller 476. The pump 126 returns the remainder of the solvent to the solvent recovery column 470. The pump 106 directs the polynuclear aromatics and other contaminants to the fuel supply tank 374 through the line 370.

Figure 20:
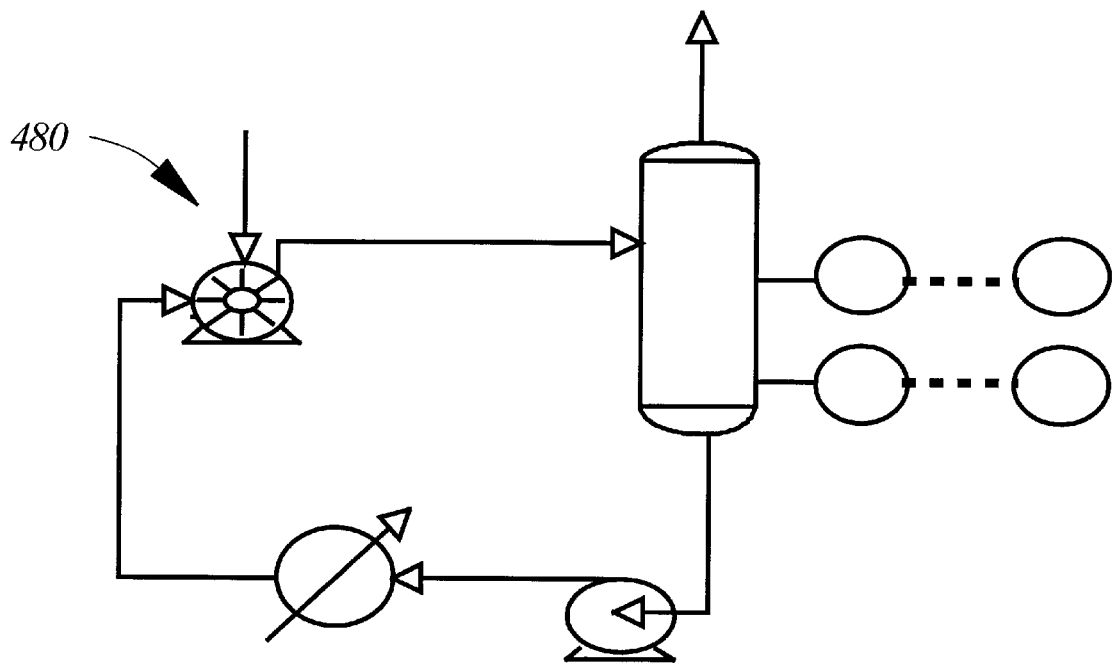
FIG. 20 is an illustration of a prior art liquid ring vacuum pump.
Figure 21:
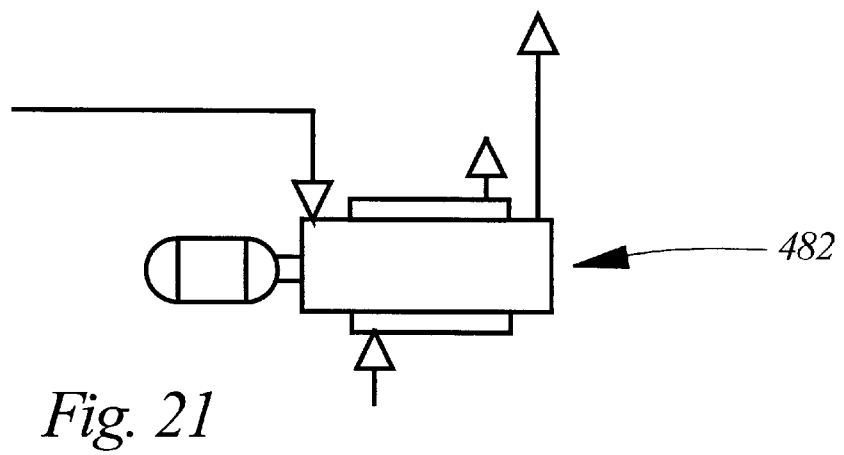
FIG. 21 is a diagrammatic illustration of a dry screw vacuum pump which may be utilized in the practice of the present invention.

FIG. 20 illustrates a prior art liquid ring vacuum pump 480 of the type utilized in the operation of the used motor oil re-refining system disclosed in the above-identified Kenton patent. FIG. 21 illustrates a dry screw vacuum pump 482 which may be utilized in the practice of the present invention in lieu of the liquid ring vacuum pump 480.

The present invention is highly successful in improving the quality of used oil distillates. Thus, in the practice of the invention, the concentration of polynuclear aromatic hydrocarbons in used oil distillates is reduced from about 200 ppm to about 1 ppm or to even lower concentrations depending upon the requirements of particular applications of the invention. The use of the method of the invention is also successful in reducing the color of used oil distillates to a level comparable with that of used oil distillates that have been hydrotreated.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:
1. A method of purifying used oil comprising the steps of:
 a. providing a flow of used oil;
 b. heating the used oil to between about 70° C. and about 125° C. in a heat exchanger;
 c. mixing the used oil with a base selected from the group including sodium hydroxide and potassium hydroxide to form a mixture comprising between about 0.5 and about 5 weight percent base;
 d. heating the used oil/base mixture in a heat exchanger to between about 110° C. and about 160° and thereby and removing a minimum of 99% of the water contained in the mixture as vapor;
 e. mixing the used oil with a phase transfer catalyst to provide a mixture comprising between about 1 and about 10 weight percent phase transfer catalyst relative to the used oil;
 f. thoroughly mixing the composition comprising used oil, base, and phase transfer catalyst;
 g. heating the composition to between about 275° C. and about 350° C. in a heat exchanger;
 h. distilling the resultant mixture into naphtha, gas oil, and at least two base lubricating oil cuts;
 i. recovering heat from the distillates;
 j. using the recovered heat to operate the heat exchangers of steps b., d., and g.;
 k. mixing each of the resulting base lubricating oil distillates with a solvent thereby dissolving the contaminants from the petroleum distillate into the solvent;
 l. separating the solvent having the contaminants dissolved therein from the petroleum distillates;
 m. subsequently separating the contaminants from the solvent and recovering the solvent;

n. recovering any remaining solvent from the petroleum distillates; and o. reusing the recovered solvent to extract contaminants from subsequent quantities of petroleum distillate.

2. The method of claim 1 wherein the distilling step removes water and catalyst and produces base lubricating oil from the mixture.

3. The method of claim 1 wherein the distilling step produces at least two base lubricating oil cuts, and wherein the subsequent mixing step is carried out by separately mixing each of the base lubricating oil cuts with the solvent.

4. A method of purifying used oil comprising the steps of:

providing a flow of used oil;

contacting the used oil with between about 0.5 and about 5 weight percent of a base;

contacting the used oil with between about 1 and about 10 weight percent of a phase transfer catalyst;

thoroughly mixing the composition comprising used oil, base, and phase transfer catalyst;

heating the composition to a temperature of between about 275° C. and about 350° C.;

distilling the resultant mixture;

mixing the resulting distillate with a solvent thereby dissolving the contaminants from the petroleum distillate into the solvent;

separating the solvent having the contaminants dissolved therein from the petroleum distillate;

subsequently distilling the solvent/contaminant mixture and thereby separating the contaminants from the solvent and recovering the solvent;

coalescing the petroleum distillate and thereby recovering any remaining solvent from the petroleum distillate; and reusing the recovered solvent to extract contaminants from subsequent quantities of petroleum distillate.

* * * * *

UNITED STATES PATENT AND TRADEMARK OFFICE
CERTIFICATE OF CORRECTION

PATENT NO.    : 6,372,122 B1  
DATED         : April 16, 2002  
INVENTOR(S)   : William A. Gorman It is certified that error appears in the above-identified patent and that said Letters Patent is hereby corrected as shown below:

Title page,
Item [63], Related U.S. Application Data, please change "Feb. 18, 1999" to -- Feb. 16, 1999 --.

Column 1,
Line 5, please change "Feb. 18, 1999" to -- Feb. 16, 1999 --.

Column 7,
Line 66, please delete "is" before "represented".

Column 11,
Line 56, please add -- by -- after "regulated".
Line 64, please delete "to" and insert -- in -- before "construction".

Signed and Sealed this

Eighteenth Day of February, 2003

JAMES E. ROGAN
*Director of the United States Patent and Trademark Office*